United States Patent
Tiemann et al.

(10) Patent No.: US 8,521,332 B2
(45) Date of Patent: Aug. 27, 2013

(54) ACTUATOR FOR HVAC SYSTEMS AND METHOD FOR OPERATING THE ACTUATOR

(75) Inventors: Dirk Tiemann, Jona (CH); Urs Gort, Zurich (CH)

(73) Assignee: BELIMO Holding AG, Hinwil (CH)

( * ) Notice: Subject to any disclaimer, the term of this patent is extended or adjusted under 35 U.S.C. 154(b) by 244 days.

(21) Appl. No.: 13/002,266

(22) PCT Filed: Jul. 3, 2008

(86) PCT No.: PCT/CH2008/000300
§ 371 (c)(1),
(2), (4) Date: Mar. 10, 2011

(87) PCT Pub. No.: WO2010/000077
PCT Pub. Date: Jan. 7, 2010

(65) Prior Publication Data
US 2011/0153089 A1    Jun. 23, 2011

(51) Int. Cl.
*G01M 1/38*    (2006.01)
*G05B 13/00*    (2006.01)
*G05B 15/00*    (2006.01)
*G05D 23/00*    (2006.01)

(52) U.S. Cl.
USPC .......... 700/276; 700/277; 700/278; 165/58; 165/67; 165/155; 236/1 R; 236/1 E

(58) Field of Classification Search
USPC ............... 700/276–278; 165/58, 67, 155; 236/1 R, 1 E
See application file for complete search history.

(56) References Cited

U.S. PATENT DOCUMENTS

| | | | |
|---|---|---|---|
| 4,497,031 A * | 1/1985 | Froehling et al. | 700/276 |
| 5,862,052 A | 1/1999 | Nixon et al. | |
| 5,912,814 A | 6/1999 | Flood | |
| 5,971,597 A * | 10/1999 | Baldwin et al. | 700/277 |
| 6,119,125 A * | 9/2000 | Gloudeman et al. | 1/1 |
| 6,167,316 A | 12/2000 | Gloudeman et al. | |
| 6,510,352 B1 | 1/2003 | Badavas et al. | |
| 6,832,120 B1 | 12/2004 | Frank et al. | |
| 7,164,972 B2 * | 1/2007 | Imhof et al. | 700/276 |
| 7,526,364 B2 * | 4/2009 | Rule et al. | 700/275 |
| 7,801,646 B2 * | 9/2010 | Amundson et al. | 700/276 |
| 7,904,209 B2 * | 3/2011 | Podgorny et al. | 700/276 |
| 8,090,452 B2 * | 1/2012 | Johnson et al. | 700/17 |
| 8,264,371 B2 * | 9/2012 | McFarland et al. | 340/870.01 |
| 2001/0025294 A1 | 9/2001 | Stripf et al. | |
| 2002/0038301 A1 | 3/2002 | Aridor et al. | |
| 2007/0114295 A1 * | 5/2007 | Jenkins | 236/51 |
| 2007/0208521 A1 * | 9/2007 | Petite et al. | 702/62 |

(Continued)

*Primary Examiner* — Ramesh Patel
(74) *Attorney, Agent, or Firm* — Sughrue Mion, PLLC

(57) ABSTRACT

An actuator for an HVAC system having a stored model definition defining an HVAC control application, and an element library including a variety of stored model elements and controller modules (D, E) having instructions for controlling a processor of the actuator. The controller modules (D, E) include model elements and are configured to control the sequential order of their execution. The controller modules (D, E) are further configured to propagate any external data input (S66', S68') to their model elements prior to executing their first model element, and to propagate any data output (S63, S65, S67, S69) to external components after executing their last model element. The controller modules (D, E) are instantiated in different threads of execution, so that data is interchanged asynchronously between instantiated controller modules (D, E) and neither temporal dependencies nor change of value links are imposed on components of the HVAC control application.

19 Claims, 9 Drawing Sheets

(56) References Cited

U.S. PATENT DOCUMENTS

| | | | |
|---|---|---|---|
| 2008/0015740 A1* | 1/2008 | Osann, Jr. | 700/276 |
| 2008/0089277 A1* | 4/2008 | Alexander et al. | 370/328 |
| 2008/0209342 A1* | 8/2008 | Taylor et al. | 715/747 |
| 2008/0222565 A1* | 9/2008 | Taylor et al. | 715/810 |
| 2008/0281472 A1* | 11/2008 | Podgorny et al. | 700/276 |

* cited by examiner

ACTUATOR FOR HVAC SYSTEMS AND METHOD FOR OPERATING THE ACTUATOR

FIELD OF THE INVENTION

The present invention relates to an actuator for HVAC (Heating, Ventilating, and Air Conditioning) systems and to a method for operating the actuator. Specifically, the present invention relates to an HVAC actuator comprising a network interface for connecting the actuator to a communication network, a bus interface for connecting the actuator to a sensor/actuator bus, a data store and a processor connected to the data store.

BACKGROUND OF THE INVENTION

In the past, HVAC systems were designed and implemented as complex and typically proprietary control systems. With the evolution of Internet based technologies, HVAC systems were increasingly adapted to a more open approach. Particularly, field devices were provided with processing power and a Java Virtual Machine platform which made it easier to use control objects on various field devices from different manufacturers. Furthermore, by implementing web servers on field devices, it became possible to access data on the field devices through conventional web browser via an IP (Internet Protocol) network.

U.S. Pat. No. 7,020,532 discloses a control device for a control system, comprising a field device such as a sensor or an actuator, and a processor for executing a control algorithm, e.g. for environmental control in residential, commercial or industrial settings. The control algorithm maintains the control system at a desired level and/or drives it to that level as a function of one or more measured values or defined set points. The control device further includes an interface to an IP network (Internet Protocol) and a web server which facilitates configuration, monitoring and/or maintenance of the control system.

U.S. Pat. No. 6,510,352 discloses a control device, e.g. a field device with a sensor/actuator interface, comprising a Java Virtual Machine for executing Java objects so that the control device provides a control function, e.g. for process control. These process control objects communicate data values, such as measurements or set points by reference, i.e. only one object stores the data value itself, while the other objects maintain merely a reference, e.g. a pointer or address, to the data value. By communicating data values by reference, data is propagated between control objects to meet real-time requirements of process control applications.

U.S. Pat. No. 6,832,120 discloses an object-oriented control system comprising network processor and field controller types of stations implementing Java Virtual Machines which can be programmed using Java objects for specific control functions. As an explicit key to achieving the objectives of the distributed object oriented control system, U.S. Pat. No. 6,832,120 teaches a real-time information synchronization manager at each station which governs the data flow between objects in the system.

U.S. Pat. No. 6,788,980 discloses a control device for a control system which may be implemented as an actuator and comprises a processor configured to run a real time operating system and a Java Virtual Machine. The control device further comprises a web server that facilitates configuration and monitoring of the control system, and an application development environment which produces Java classes for execution in control devices. Operator stations and similar non-process data producers are kept in sync using a Simple Network Time Protocol (SNTP); whereas, the controllers requiring higher accuracy are placed on tightly controlled networks or equipped with an interrupt used to coordinate time updates.

For meeting real-time requirements of typical control applications, the control systems of the prior art are configured for synchronized data communication. In essence, synchronized data communication ensures that data values generated and/or output by a data source (data provider) is transmitted and/or supplied to a data sink (data consumer) within a defined time window in order to meet the specific real-time requirements of the respective control application. Thus, implementation of synchronized data flow imposes a temporal and/or sequential dependence on the components participating in a distributed control application. More importantly, for a synchronized data flow, it is necessary to implement synchronization mechanisms which require significant processing power and/or communication bandwidth.

U.S. Pat. No. 6,167,316 discloses a distributed object-oriented building automation system with asynchronous communication between objects running on different devices. Application objects which need to be informed about changes of the value of another object's control attributes use a connection object to establish an asynchronous link between application objects. The connection object manages the information transfer between the two application objects. The connection object registers with the source object to receive from the source object a message containing the value of the control attribute when the change in its value exceeds a defined value (change of value processing). The connection object in turn passes the received value of the control attribute to the destination object. Thus, U.S. Pat. No. 6,167,316 implements a messaging mechanism which facilitates timely communication of significant changes of data values between objects located on different devices.

SUMMARY OF THE INVENTION

It is an object of this invention to provide an actuator for HVAC (Heating, Ventilating, and Air Conditioning) systems and a method for operating the actuator, which actuator and method do not have some disadvantages of the prior art. In particular, it is an object of the present invention to provide an actuator for HVAC systems and a method for operating the actuator, whereby the actuator enables control applications in HVAC systems without imposing temporal dependencies on components of the control application that exchange data.

According to the present invention, these objects are achieved particularly through the features of the independent claims. In addition, further advantageous embodiments follow from the dependent claims and the description.

An actuator for HVAC systems comprises a network interface for connecting the actuator to a communication network, a bus interface for connecting the actuator to a sensor/actuator bus, a data store and a processor connected to the data store.

According to the present invention, the above-mentioned objects are particularly achieved in that a model definition defining an HVAC control application is stored in the actuator. For example, the model definition is loaded via a communication network into a data store of the actuator. For example, the model definition is defined in a mark-up language, e.g. XML (extended markup language). For example, the communication network includes an Ethernet communication network and is configured for communication according to the Internet Protocol. Moreover, an element library is stored in the actuator, which element library includes a variety of model elements and controller modules. The model elements and controller modules comprise instructions for controlling a processor of the actuator. For example, the stored model elements and controller modules are defined in Java byte code, and the processor is a Java processor configured to execute Java byte code (e.g. IMSYS IM 1101). For example, the stored model elements include elements representative of a controller, a PID controller, a two point controller, a limiter, a timer, a Boolean logic module, a time period management module, a heating curve module, a filter module, a floating average calculation module, a flip flop module, an input selector module, a constant value module, a comparator, a mathematical operation module, a state checking module, an error catching module and/or an error trigger module. Based on the model definition, implemented in the actuator is the control application for execution on the processor, by instantiating from the element library controller modules and associated model elements as referenced by the model definition, assigning at least one instantiated model element to a device attached to a sensor/actuator bus, and instantiating the controller modules in each case as a different thread of execution. For example, the sensor/actuator bus includes an MP-Bus (proprietary sensor/actuator bus by Belimo Automation AG), a BACnet-bus, a Profibus or another field bus. The control application is executed by the respective controller modules in each case controlling the sequential order of execution for associated model elements referenced by the respective controller module, propagating any external data input (i.e. data input stored by components outside the respective controller module in peripheral data input buffers of the respective controller module) to its associated model elements prior to beginning the execution of the model element defined first in the sequential order, and propagating any data output from its associated model elements to the outside of the respective controller module after completion of the execution of the model element defined last in the sequential order, so that data is interchanged asynchronously between instantiated controller modules.

Thus, the controller module makes it possible to group (nest) hierarchically a variety of module elements (components) and to define input/output buffers on the peripheral boundaries of the controller module, such that input/output buffers of inner module elements can only be accessed through these peripheral input/output buffers. Preferably, a periodically executed, individual updating/processing interval is assigned to a controller module. The controller module is configured to control within its interval the sequential processing of its model elements, whereby any input data is propagated initially (i.e. before processing of the model elements) from the peripheral input buffers of the controller module to input buffers of connected model elements. Subsequently, triggered individually according to a sequential order determined by the controller module, the model elements compute their output values based on their current data values read from their input buffers. When processing of a model element is completed, the controller module propagates the respective model element's data output values to connected model elements by reading in each case the data value stored in a data output buffer of the (source) module element, and writing it into the data input buffer of connected (sink) module elements. If the data output buffer of a model element is connected to a peripheral data output buffer of its controller module, the respective controller module also propagates the current data value from the model element's data output buffer to the respective peripheral data output buffer. Different controller modules run in different threads of execution with individual processing intervals of different duration (i.e. different periodicity).

By having the controller modules configured to propagate any external data input to all their respective model elements, before processing of the first model element in their respective processing sequence, and to propagate any data output from their respective model elements to components outside the model controller, after completion of all their respective model elements in their respective processing sequence, and by instantiating the controller modules as parallel threads of execution, data is exchanged asynchronously between different controller modules, i.e. between the model elements associated with different controller modules. This makes it possible to implement and execute control applications in HVAC systems without temporal dependencies imposed on components of the control application that exchange data, and coupling application objects for change of value processing (COV). Consequently, there is neither any need for synchronization mechanisms nor for inter-object signaling messages. Hence, the asynchronous data transfer between model elements associated with different model controllers makes it possible to conserve significant processing power, processing time and communication bandwidth, which would otherwise be required for synchronization and messaging mechanisms. Furthermore, the asynchronous data transfer makes it possible to structure and implement HVAC control applications with loosely coupled components, and hence to distribute flexibly and efficiently the HVAC control application not only over several logical controller modules on one processor device, but also over more than one processor device interconnected by a communication network, e.g. by placing and executing different controller modules on several processor devices such as actuators or other hardware devices which include a processor.

Preferably, the model elements are in each case configured to read input data from one or more defined data input buffers associated with the respective model element, and to write output data to one or more defined data output buffers associated with the respective model element. The model interpreter is further configured to link, based on linking information included in the model definition, output buffers of instantiated model elements to input buffers of instantiated model elements. The controller modules are further configured to propagate in each case, upon completion of the execution of model elements referenced by the respective controller module, data values from the model element's output buffer to a linked input buffer of a model element referenced by the respective controller. Thus, a model element providing data output writes (stores) its data output in an output buffer. By interconnecting a first instantiated model element to a second instantiated model element for transferring data output from the first model element to the second model element, an output buffer of the first model element is associated with an input buffer of the second model element. Once processing of a model element is completed, i.e. when the model element's data output is placed in its data output buffer(s), the respective controller module propagates the data values to linked data input buffers.

In an embodiment, the model definition includes identifiers of model elements and parameter values applicable in each case to the respective model element, and the model interpreter is configured to instantiate in each case the model element from the library based on the identifier and parameter values.

In another embodiment, the actuator comprises a server module configured to transmit to a web browser via the communication network a graphical representation of the control application based on the model definition. Preferably, the model definition includes graphical user interface data associated with model elements referenced by the model definition. For example, the graphical user interface data includes position information and/or size information for positioning and/or sizing the graphical representation of respective model elements on a display. In an embodiment, the loader is further configured to store in the actuator at least one HTML (Hypertext Markup Language) version of the model definition. The server module is further configured to transmit to the web browser for display in the graphical representation input/output values associated in each case with a model element referenced by the model definition, to receive from the web browser parameter values associated in each case with a model element referenced by the model definition, and to store in the actuator the parameter values assigned to an instantiation of the respective model element. Thus, current values of model elements, e.g. values representative of a sensor measurement or an actuator setting, can be shown to a user via the web browser in a graphical representation of the control application. Furthermore, it is possible for the user to enter parameter settings, e.g. settings for a PID controller, via the browser in the graphical representation of the control application for automatic update of corresponding parameter settings in the control application executing in the actuator.

In a further embodiment, at least some of the stored model elements are configured to be operable in different modes, the modes being selectable through setting at run-time of a state associated with an instantiation of the respective model element. Preferably, these model elements are further configured to indicate as an output value the current state or mode of the respective model element.

Preferably, the network interface is configured to exchange data with other corresponding actuators via the communication network. By connecting more than one actuator to the communication network, implemented is a distributed control application for an HVAC system. The distributed control application runs decentralized on a network of actuators, each actuator on the communication network runs a part of the distributed control application, this part being defined by its respective (sub-) model definition, and controls as a master the devices (slaves) that are attached to its sensor/actuator bus.

In addition to the actuator and a corresponding method for operating the actuator, the present invention also relates to a computer program product comprising computer program code means for controlling one or more processors of an actuator for HVAC systems, preferably a computer program product comprising a computer-readable medium containing the computer program code means therein.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
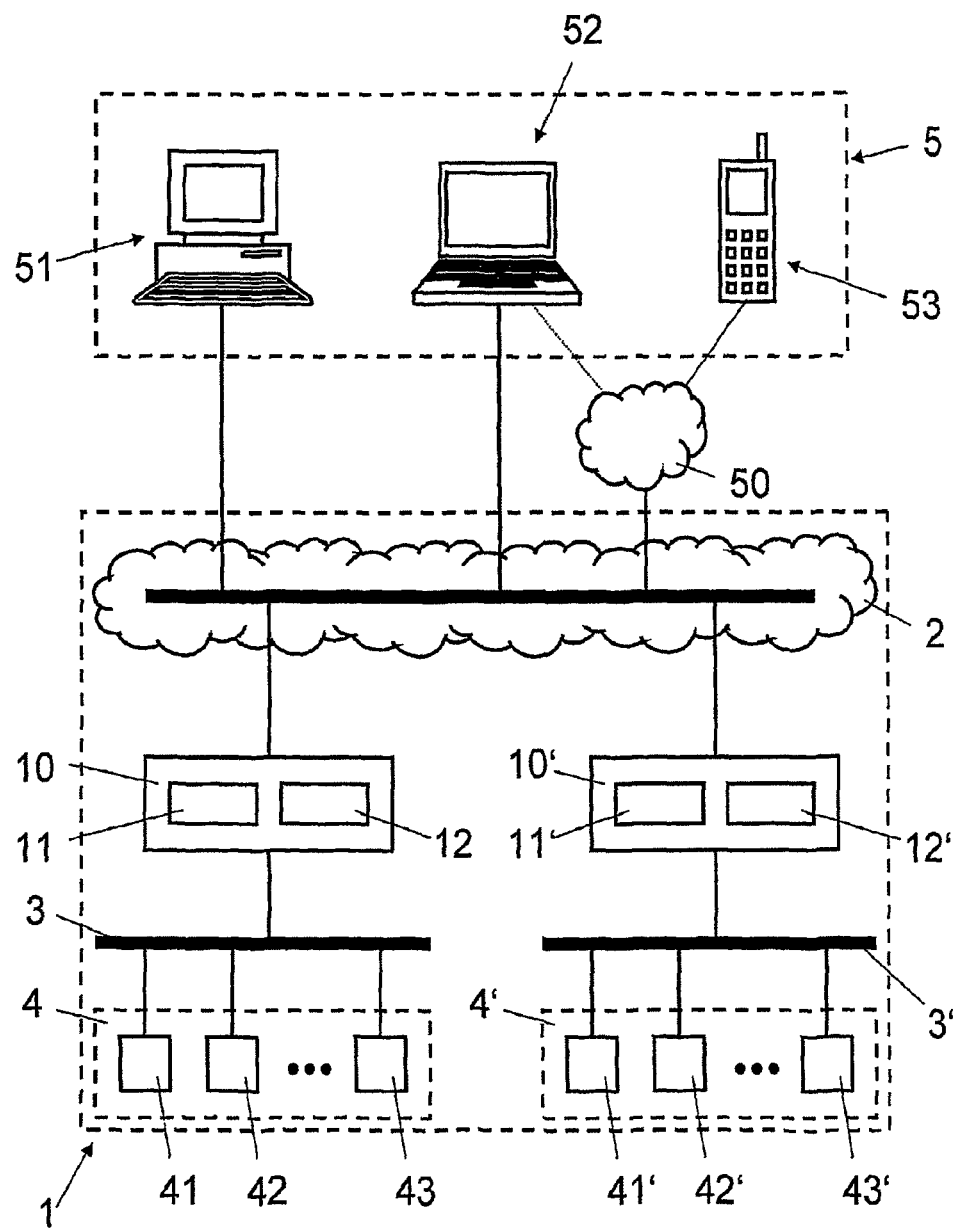
FIG. 1: shows a block diagram illustrating schematically an HVAC system comprising actuators which are connected to a sensor/actuator bus as well as to a communication network.

In FIG. 1, reference numeral 1 refers to a Heating, Ventilating, and Air Conditioning (HVAC) system comprising one or more actuators 10, 10' interconnected via a communication network 2, such as an IP network over Ethernet. Preferably, the actuators 10, 10' include a motor and are configured to drive valves and/or dampers for fluid pipes, e.g. to control the flow of air or water in the HVAC system 1 by adjusting the settings of dampers or valves, respectively. Depending on the embodiment, the communication network 2 is connected to the world wide web and is accessible to remote computers 5, e.g. fixed personal computers 51 (PC) via fixed telecommunication networks, and/or mobile computers such as laptop or notebook computers 52, personal digital assistants (PDA) or mobile radio phones 53, via mobile radio networks such as GSM-networks (Global System for Mobile Communications), UMTS-networks (Universal Mobile Telephone System) and/or wireless local area networks (MAN).

As is illustrated in FIG. 1, the actuators 10, 10' each comprise a processor 11, 11' and a data store 12, 12' connected to the processor 11, 11'. Preferably, the processor 11, 11' is a Java processor configured to execute directly Java byte code, e.g. Java processor IMSYS IM 1101 by Imsys Technologies AB.

The actuators 10, 10' are each connected to a sensor/actuator bus 3, e.g. an MP-Bus by Belimo Automation AG, a BACnet bus or a Profibus. The actuators 10, 10' are configured as masters for controlling (slave) devices 4 attached to the sensor/actuator bus 3, e.g. sensors 41, 41', actuators 42, 42', or other field devices 43, 43'.

Figure 2:
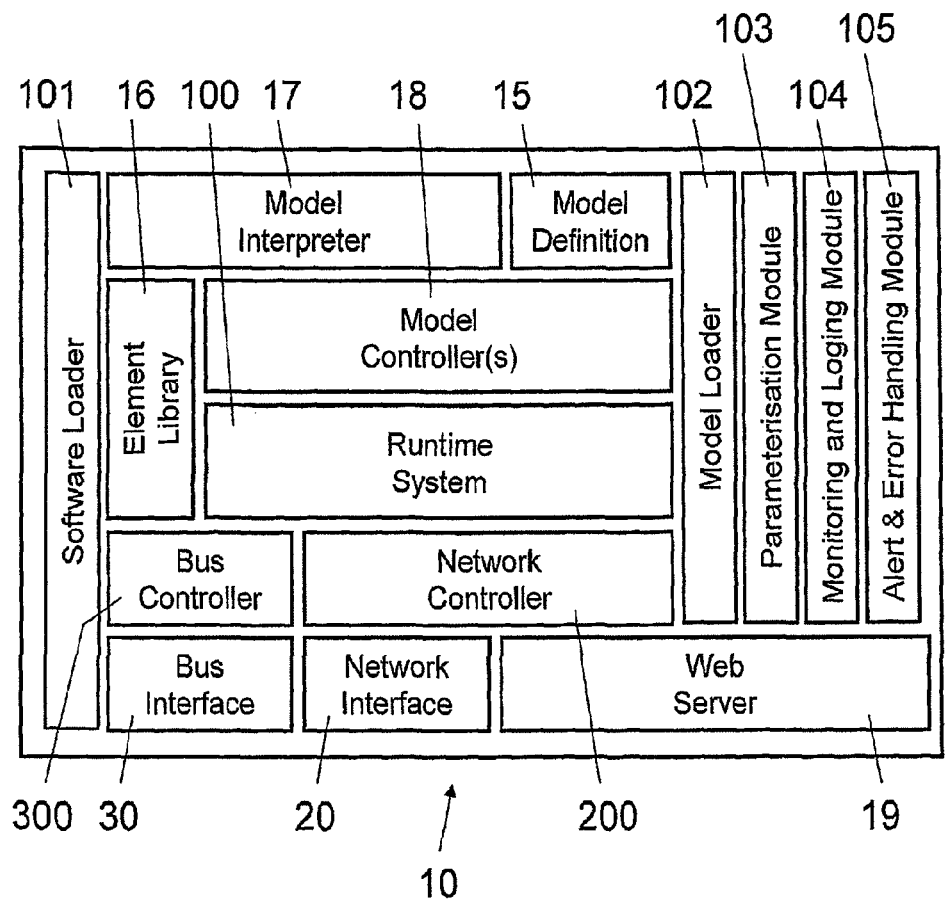
FIG. 2: shows a block diagram illustrating schematically an actuator comprising various functional modules.

As is illustrated in FIG. 2, the actuator 10 comprises a network interface 20 for connecting the actuator 10 to the communication network 2, and a bus interface 30 for connecting the actuator 10 to the sensor/actuator bus 3. Furthermore, the actuator 10 comprises various functional modules including a software loader 101, a model loader 102, a model interpreter 17, a parameterisation module 103, a monitoring and logging module 104, an alert and error handling module 105, and a web server module 19.

is The software loader 101 is configured to download firmware via the communication network 2 and install the firmware in the actuator 10. Moreover, the software loader 101 is configured to download and store various model elements in the element library 16 of data store 12. Each model element is a functional block and comprises instructions, e.g. Java byte code, for controlling the processor 11. Typically, a model element includes one or more data input buffers (some model elements, e.g. a constant value element, may be implemented without a data input buffer), a functional component, possibly (input) parameters associated with the functional component, and one or more data output buffers (some model elements, e.g. an error trigger module, may be implemented without a data output buffer). The model elements are configured to read the current data input values stored in their input buffer(s), to compute from the data input value(s) one or more data output values using the functional component and parameters associated with the functional component, and to write the data output value(s) to the output data buffer(s). Model elements can be developed and provided as open source modules.

The model elements are grouped into control elements, I/O elements (input/output), and general purpose elements. For example, the model elements in the group of control elements include various controllers, e.g. a PID controller or a two point controller, a limiter for generating and limiting an data output value to a defined range of a data input value, a timer, a Boolean logic module, e.g. a Boolean AND, OR and/or NOT, a time period management module, e.g. for setting a time period such as a part of the day (day/night, AM/PM), a vacation period or a season (winter, spring, summer, fall), a heating curve module, a filter module, a floating average calculation module, a flip flop module, an input selector module for selecting the value of the data output based on defined criteria from various data inputs, a constant value module, a comparator for comparing data input values, a mathematical operation module for executing mathematical operations such as addition, subtraction, multiplication, division, summation, calculation of average, or determination of minimum or maximum values, and/or a state checking module for checking the current state of nested model elements. For example, the model elements in the group of I/O elements include elements representative of devices 4 on the sensor/actuator bus 3, e.g. sensors, actuators, and connectivity elements for connecting more than one sensor or actuator to the sensor/actuator bus 3, or actuators 10, 10' connected to the communication network 2. For example, the model elements in the group of general purpose elements include an error catching module and/or an error trigger module for connecting the HVAC control application to the alert and error handling module 105.

Figure 9:
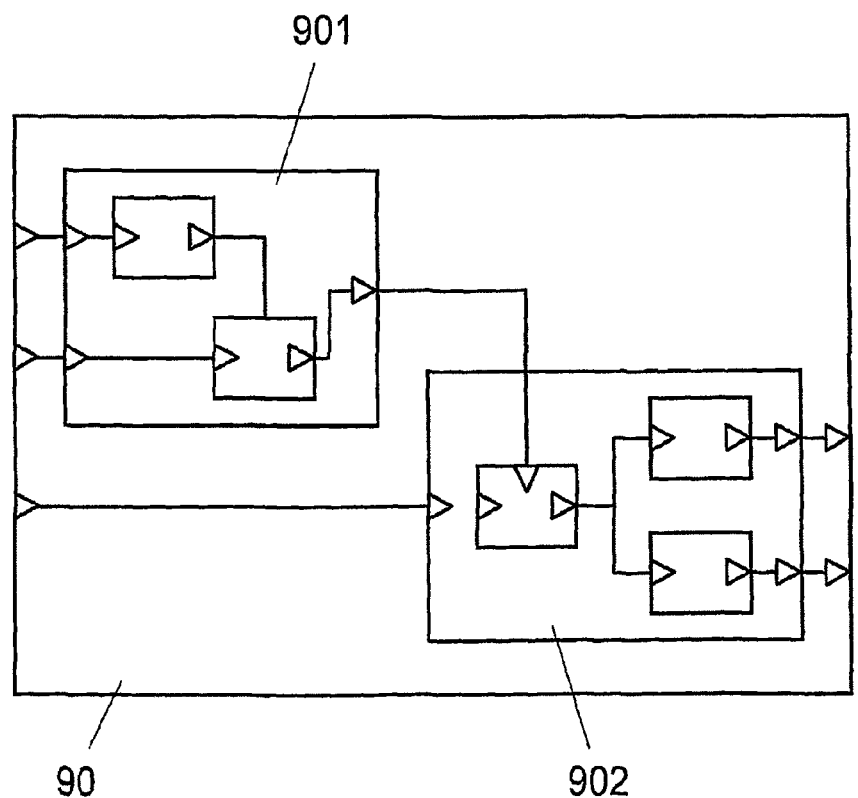
FIG. 9: shows a block diagram illustrating an example of a nested element (compound).

The element library 16 further comprises nested model elements (compounds) and controller modules, particularly model controller modules, bus controller modules, and network controller modules. The controller modules and compounds are configured to include various selected model elements which are interconnected (linked). Table 1 illustrates the hierarchical relationship of controller modules, nested model elements (compounds), and model elements. FIG. 9 illustrates an example of a nested element 90 (compound) comprising two interconnected inner nested elements 901, 902. The inner nested elements 901, 902 each comprise several interconnected model elements. As illustrated in FIG. 9, inner elements are only linked to other inner elements at the same hierarchical level and/or to data input/output buffers of the surrounding, higher level element. Depending on the specific application, the controller modules include model elements and/or nested model elements (compounds); and a nested model element (compound) includes model elements and/or nested model elements. Typically, the model controller module 401 is associated with interconnected (linked) control elements, whereas the bus controller module 402 and the network controller module 403 are associated with I/O elements. The bus controller module 402 and the network controller module 403 encapsulate all interactions with the underlying sensor/actuator bus 3 and communication network 2, respectively. Specifically, the bus controller module 402 and the network controller module 403 encapsulate retrieving sensor data from and setting actuator values on devices attached to the sensor/actuator bus 3 and communication network 2, respectively.

TABLE 1

| Controller module | | |
|---|---|---|
| Model element | Nested model element (compound) | |
| | Model element | Nested model element (compound) |
| | | Model element |

Figure 5:
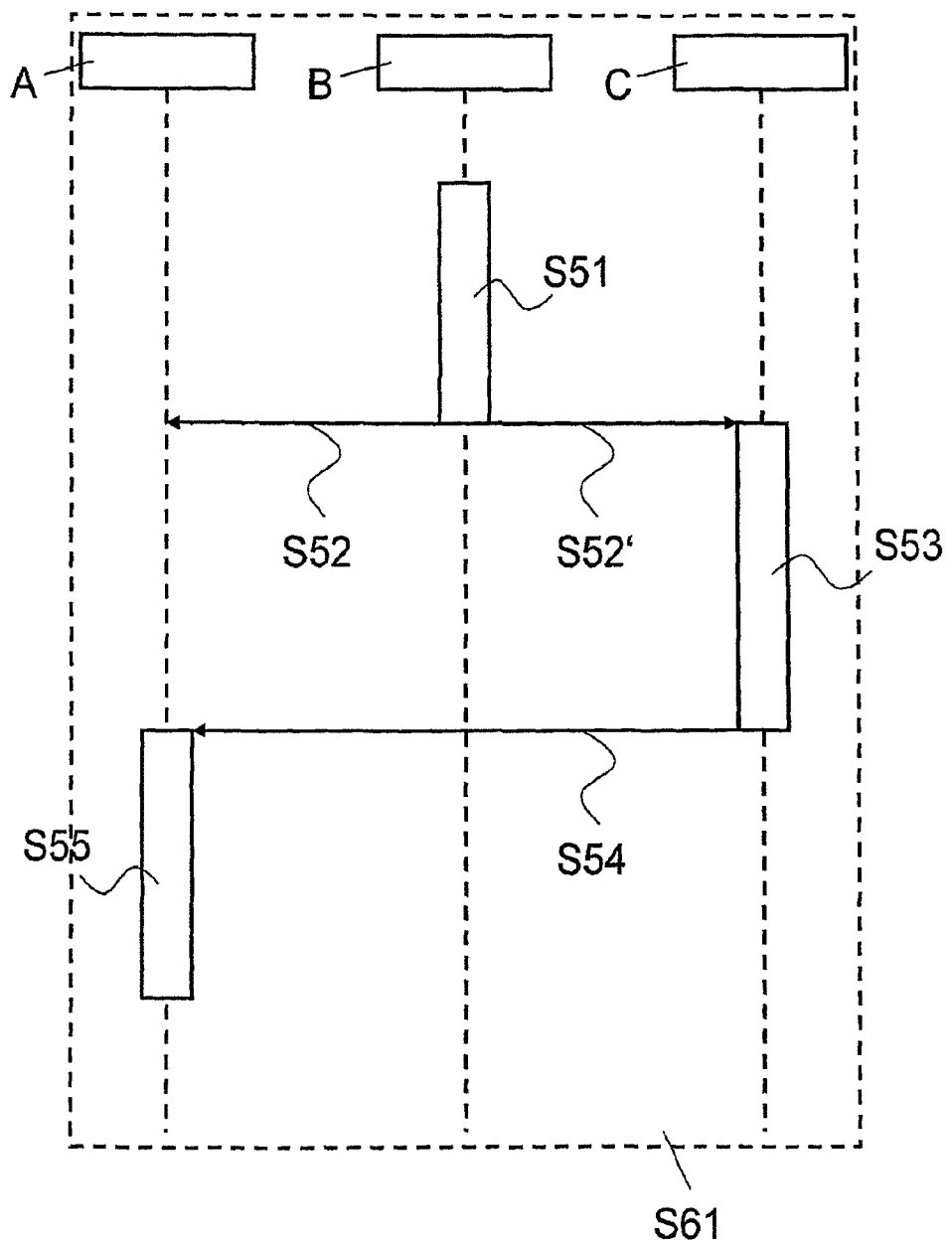
FIG. 5: shows a timing diagram illustrating an example of sequential processing of model elements associated with a controller module.

The controller modules and compounds are configured to control the sequential order of execution of their associated model elements and/or nested model elements, and to control data propagation between linked model elements and/or nested model elements. The processing sequence is determined by the order in which the model elements are arranged (linked), the types of model elements, and/or some priority setting. A compound (nested model element) is processed by taking into consideration the sequential order and nesting levels of its elements, all inner elements are processed and the data output values propagated along their connections. For example, in FIG. 9, for processing (updating) the nested model element 90, the inner model elements of the nested model element 901 are processed first, then the output of nested model element 901 is propagated to the nested model element 902, and, subsequently, the inner model elements of the nested model element 902 are processed. It is also possible for the user to specify for nested elements, the order in which nested elements are updated. Specifically, the controller modules are configured to propagate, at start-up, the current data input values from their peripheral data input buffers to respective linked data input buffers of their associated model elements. The controller modules are further configured, to subsequently trigger execution of their model elements based on a defined processing sequence, and, upon completion of a model element's (or compound's) execution, to propagate the output data from the completed model element's data output buffer(s) to data buffers linked to the completed model element's data output buffer(s). The output data is thereby propagated by the controller modules to linked data input buffers of other model elements included in the controller module, as well as to peripheral data output buffers associated with the controller module. FIG. 5 illustrates an example of the sequential processing of model elements A, B and C, associated with a controller module or compound (e.g. controller module D of FIG. 6). In this example, model element B is executing in step S51. In steps S52 and S52', model element B propagates its data output to the data input buffers of model elements C and A, respectively. In step S53, the next model element to be executed, in this exemplary sequence model element C, reads the current data value in its input buffer and performs its function based thereon. In step S54, model element C propagates its data output to the data input buffers of model element A (the data output buffers of model elements B and C are linked to different data input buffers of model element A). In step S55, model element A commences execution using the current data input value written in its data input buffer by model element C.

The controller modules are further configured to propagate, upon completion of all their associated model elements' execution, the data values of all their peripheral data output buffers to respective linked peripheral data input buffers of other controller modules. The controller modules are configured to run as independent processes without any pre-defined mutual synchronization with other controller modules. Each controller module has assigned an individual processing interval; however, there is no pre-scheduled point in time for processing. Rather, the controller modules are configured to run independently from each other, i.e. each controller module is configured to run as a different thread. Consequently, data is exchanged asynchronously between linked components of the system. Particularly, asynchronous data transfer is achieved between control elements associated with a model controller module and I/O elements associated with a bus controller module or a network controller module.

Figure 6:
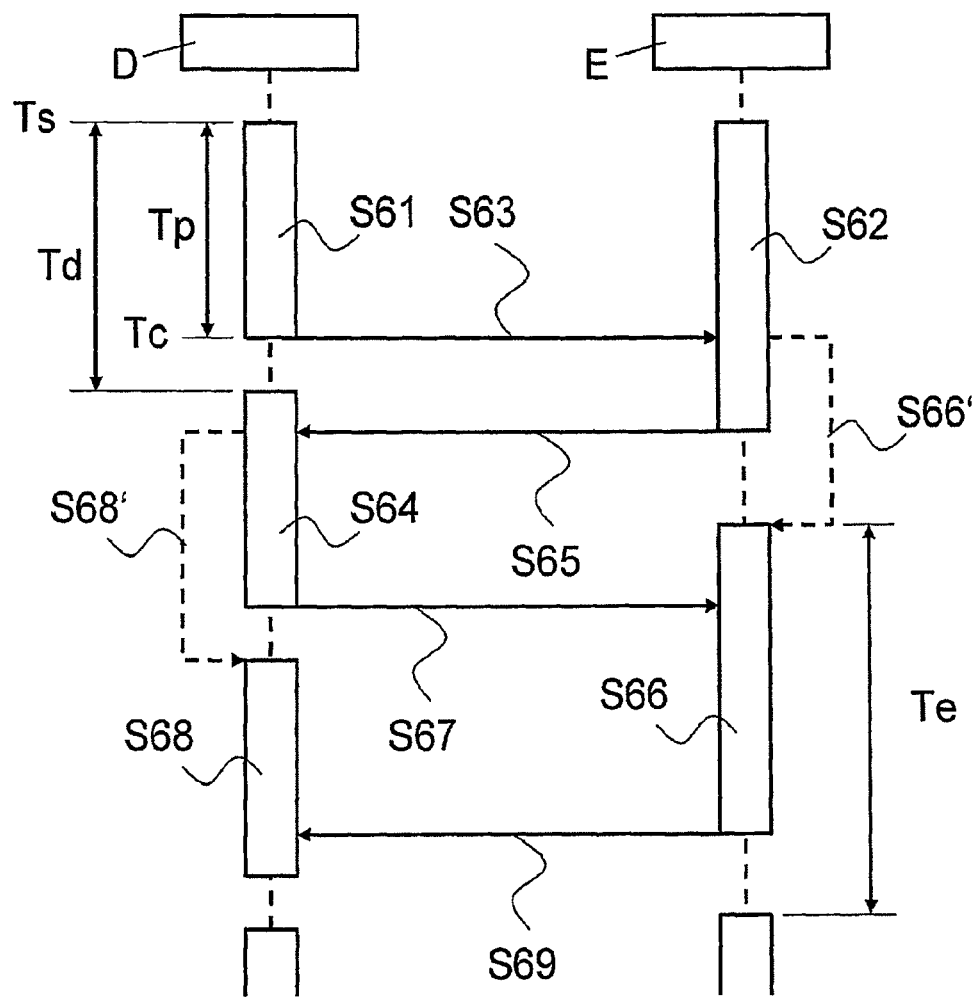
FIG. 6: shows a timing diagram illustrating an example of parallel processing of controller modules executing in separate threads.

FIG. 6 illustrates an example of parallel processing of controller modules D and E, as well as the asynchronous data transfer between the controller modules D and E. In step S61 and S62, controller modules C and D are executing in parallel as independent threads. Upon completion of step S61 by controller module D, output data is propagated in step S63 from the controller module D's peripheral data output buffers to respective linked peripheral data input buffers of controller module E. However, because controller module E has at the start of step S62 already propagated internally the data input of its peripheral data input buffers to its respective model elements, the current data input provided by model controller D in step S63 will not be considered until the next processing interval of controller module E in step S66. Only later, at the start of step S66, in step S66', controller module E will read the data from its data input buffers as current input data. Accordingly, controller module D will not consider output data propagated in step S65, at completion of step S62, from the controller module E's peripheral data output buffers to respective linked peripheral data input buffers of controller module D, because controller module D has already propagated internally the data input of its peripheral data input buffers to its respective model elements at the start of step S64. Only later, at the start of step S68, in step S68', controller module D will read the data from its data input buffers as current input data. Correspondingly, output data propagated in steps S67 and S69 will not be propagated internally by controller module E during execution of step S66, or by controller module D during execution of step S68, respectively. One skilled in the art will understand, that alternative propagation strategies may enable data input propagation to model elements that have not yet started executing in the current processing interval of a controller module.

The bus controller module is further configured to map associated I/O elements onto the devices 4 on the sensor/actuator bus 3, as well as to control and handle the bus interface 30 and data communication via the sensor/actuator bus 3.

The network controller module is further configured to map associated I/O elements, e.g. an actuator element, onto devices connected to the communication network 2, e.g. actuator 10', as well as to control and handle the network interface 20 and data communication via the communication network 2.

The model loader 102 is configured to download a model definition 15 via the communication network 2, and install it in the actuator 10. The model definition 15 defines in a markup language, e.g. XML, an HVAC control application or a part of an HVAC control application for controlling the HVAC system 1.

TABLE 2

```
<?xml version="1.0"?>
<?xml-stylesheet href="bd.xsl" type="text/xsl" ?>
<System type="system.BDSystem" id="0">
<Controller type="system.MpController" id="2000">
<element type="mp.MpActuator" id="2010">
```

TABLE 2-continued

```
<property name="BusAddress" value="1"/>
</element>
<element type="mp.MpBusAnalogInput" id="2030">
<property name="BusAddress" value="1"/>
<property name="MeasureRange" value="PassiveLowOhm"/>
</element>
<!- connect MpBusAnalogInput to the PTSensor1 (2040) ->
<connection source_id="2030" source_pin="0" target_id="2040"
target_pin="0"
description="Current water temperature"/>
<!- connect the actuator to the mpcontroller->
<connection source_id="2010" source_pin="0" target_id="2000"
target_pin="7" description="current position"/>
</Controller>
<Controller type="system.ModelController" id="3000">
<element type="model.elements.SysTimeElement" id="3010"/>
<element type="model.elements.CurveController" id="3030">
<property name="0" value="-14.0, 65.0, 20.0, 30.0"/>
<property name="1" value="-14.0, 50.0, 20.0, 20.0"/>
</element>
<element type= "model.elements.Pid" id= "3040">
<property name="pFactor" value="0.8"/>
<property name="iFactor" value="0.1"/>
<property name="dFactor" value="0.0"/>
<property name="lowerLimit" value="0.0"/> <!-0%->
<property name="upperLimit" value="100.0"/> <!- 100% ->
<property name="sampleRate" value="1000"/> <!- ms ->
</element>
<!- connect the model controller to the PID element ->
<connection source_id="3000" source_pin="0" target_id="3040"
target_pin="1" description="Current Water temperature (IS)"/>
<!- connect the CurveController element to the PID element ->
<connection source_id="3030" source_pin="0" target_id="3040"
target_pin="2" description="Requested Water temperature (TARGET)"/>
</Controller>
<!- connect the mpcontroller to the modelcontroller (set position) ->
<connection source_id="3000" source_pin="0" target_id="2000"
target_pin="3"
description="set position"/>
</System>
```

Figure 4:
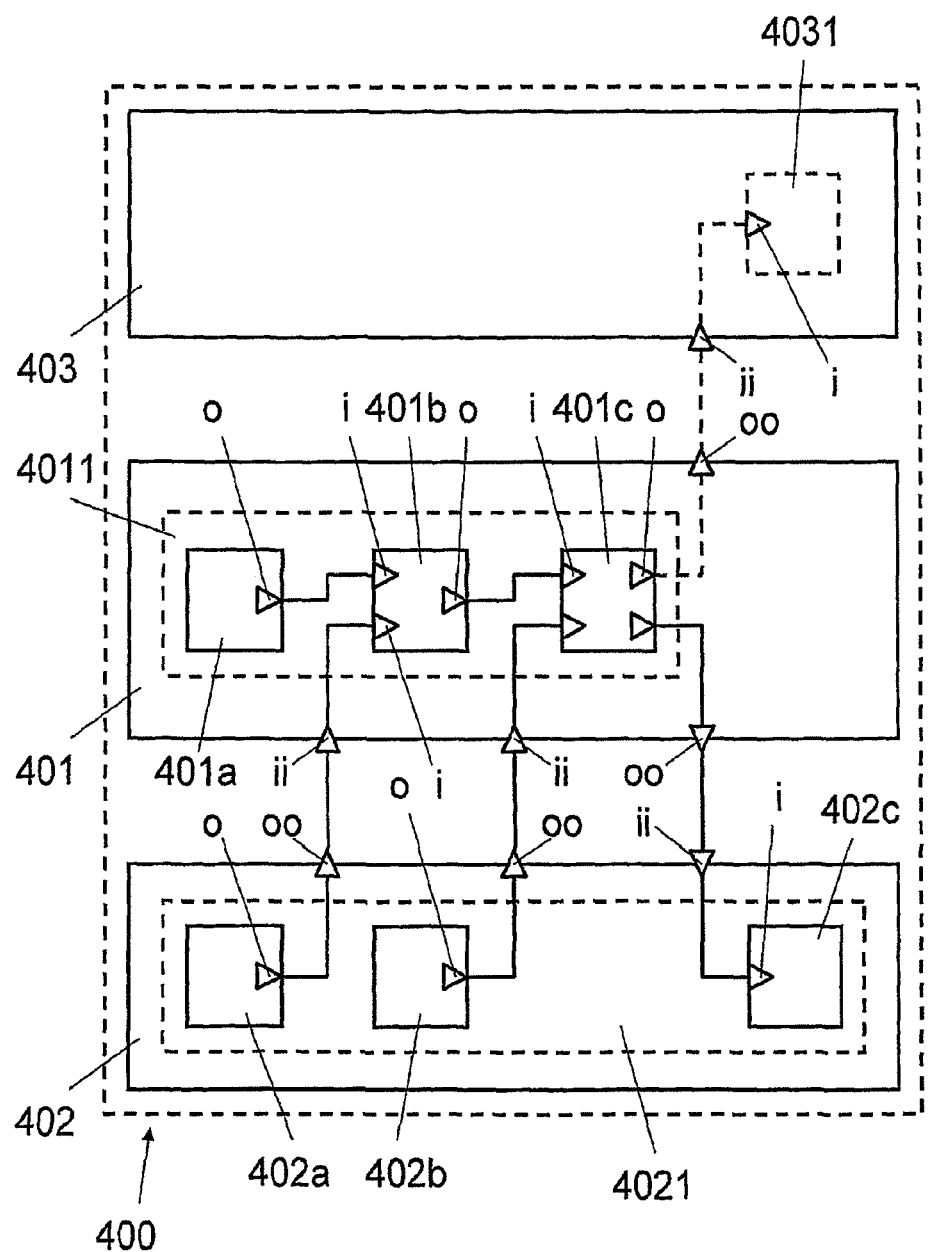
FIG. 4: shows a graphical representation of an example of a model definition, including a model controller module, a bus controller module and a network controller module with associated model elements.

Table 2 shows an example of an XML model definition relating to a heat curve control application, as illustrated in FIG. 4. The heat curve control application includes a timer control element 401a, an outside temperature sensor element 402a, a heating curve control element 401b, a PID controller element 401c, a flow temperature sensor element 402b, and a valve actuator element 402c.

FIG. 4 shows a graphical representation 400 of an example of a model definition 105. As illustrated in FIG. 4, the model definition comprises one or more model controller modules 401, a bus controller module 402 and optionally a network controller module 403. These controller modules are associated with (i.e. include) various interconnected model elements 4011, 4021. Typically, the model controller module 401 includes control elements, whereas the bus controller module 402 and the network controller module 403 include I/O elements, Depending on the specific application, the model definition 15 and/or the controller modules may also make reference to nested model elements, comprising more than one linked, i.e. interconnected, model element.

The model definition 15 not only references various model elements 4011, 4021 (or nested model elements), but also includes parameter values associated with the respective model elements as well as linking information specifying links between the model elements. A link between model elements 4011 assigns a data output buffer o of a model element 401a, 401b, 401c providing output data, to an input buffer i of a model element 401b, 401c using the data. For example, in FIG. 4, the data output buffer o of model element 401a, e.g. a timer control element, is linked to a data input buffer i of model element 401b, e.g. a heating curve control element; and the data output buffer o of model element 401b is linked to a data input buffer i of model element 401c, e.g. a PID controller element.

As can be seen in FIG. 4, model elements associated with different controller modules are not linked directly, i.e. a data output buffer o of a model element is not linked directly to a data input buffer i of a model element located in another controller module. Links between model elements located in different controller modules are defined through peripheral data input/output buffers associated with the respective controller modules. For example, in FIG. 4, the output buffers o of model elements 402a, e.g. an outside temperature sensor element, and 402b, e.g. a flow temperature sensor element, are linked respectively to input buffers i of model element 401b (heating curve), or model element 401c (PID controller), via a respective peripheral data output buffer oo of the bus controller module 402 and a respective peripheral data input buffer ii of the model controller module 401. Correspondingly, in FIG. 4, the data output buffer o of model element 401c is linked to a data input buffer i of model element 402c, e.g. a valve actuator, via a respective peripheral data output buffer oo of the model controller module 401 and a respective peripheral data input buffer ii of the bus controller module 402.

In FIG. 4, reference numeral 4031 refers to model element of network controller module 403, which model element 4031 is representative of an optional actuator that is accessible to actuator 10 only through communication network 2. Accordingly, FIG. 4 illustrates an optional link from a data output buffer o of model element 401c (PID controller) to a data input buffer i of model element 4031 via a respective peripheral data output buffer oo of the model controller module 401 to a respective peripheral data input buffer ii of network controller module 403.

The model interpreter 17 is configured to implement the HVAC control application as defined by the model definition 15 for execution on the processor 11. The model interpreter 17 instantiates model elements from the element library 16 as referenced by the loaded model definition 15, using parameters as specified with the model definition 15. The HVAC control application comprises at least one model controller module, a bus controller module and an optional network controller module.

Thus, as illustrated in FIG. 2, once the model interpreter 17 has implemented the HVAC control application, the actuator 10 includes one or more instantiated model controller(s) 18, an instantiated bus controller 300, and an instantiated network controller 200. The model controller 18 includes various instantiations of control elements (and/or nested model elements) interconnected to implement a (control) part of the HVAC control application, e.g. corresponding to model controller module 401 illustrated in FIG. 4. The bus controller 300 comprises instantiations of I/O elements representative of devices 4 on the sensor/actuator bus 3, e.g. corresponding to bus controller module 402 illustrated in FIG. 4. The network controller 200 comprises optionally instantiations of I/O elements representative of devices on the communication network 2, e.g. corresponding to network controller module 403 illustrated in FIG. 4.

The runtime system 100 is configured to handle and route data traffic between the network controller 200, the bus controller 300, and the HVAC control application as defined by the model definition 15 and implemented by the model interpreter 17.

The parameterisation module 103 is configured to receive from a remote computer 5 via the communication network 2 parameters for the HVAC control application defined by the model definition 15, and to store these parameters in the data store 12. The parameterisation module 103 is further configured to transmit to a remote computer 5 via the communication network 2 current values of parameters of the HVAC control application (e.g. for display on the remote computer 5).

The monitoring and logging module 104 is configured to provide to the remote computers 5 via the communication network 2 current data values provided and stored by the HVAC as well as by the alerting and error handling module 105.

The web server module 19 is configured to provide web access, e.g. to web browsers running on the remote computers 5, for accessing the model loader 102, the parameterisation module 103, the monitor and logging module 104, the alerting and error handling module 105, and possibly the software loader 101 via the communication network 2.

Thus, using a conventional web browser, a user of a remote computer 5 is enabled to not only monitor in a graphical representation current data values relating to sensor readings, actuator settings, and/or operative and error states of the HVAC control application running on or more actuators 10, 10', but also to reset and adjust dynamically parameter settings for HVAC control application at run-time.

The present approach makes it possible to adapt an HVAC system flexibly to specific and possibly changing application requirements. If more than one branch of a sensor/actuator bus 3 is needed for the HVAC system, the HVAC control application is decentralized and distributed efficiently over more than one actuator 10, 10'. If the HVAC application is divided into several sub-systems to run distributed over several actuators 10, 10', each subsystem is defined by its own model definition as part of the whole model. For efficiency and robustness, the sub-models are designed preferably as independent, loosely coupled processes. If an HVAC system requires just one sensor/actuator bus 3, the complete HVAC control application is centralized and runs on one actuator 10 which acts as single system controller and master of the devices 4 attached to the sensor/actuator bus 3.

Figure 3:
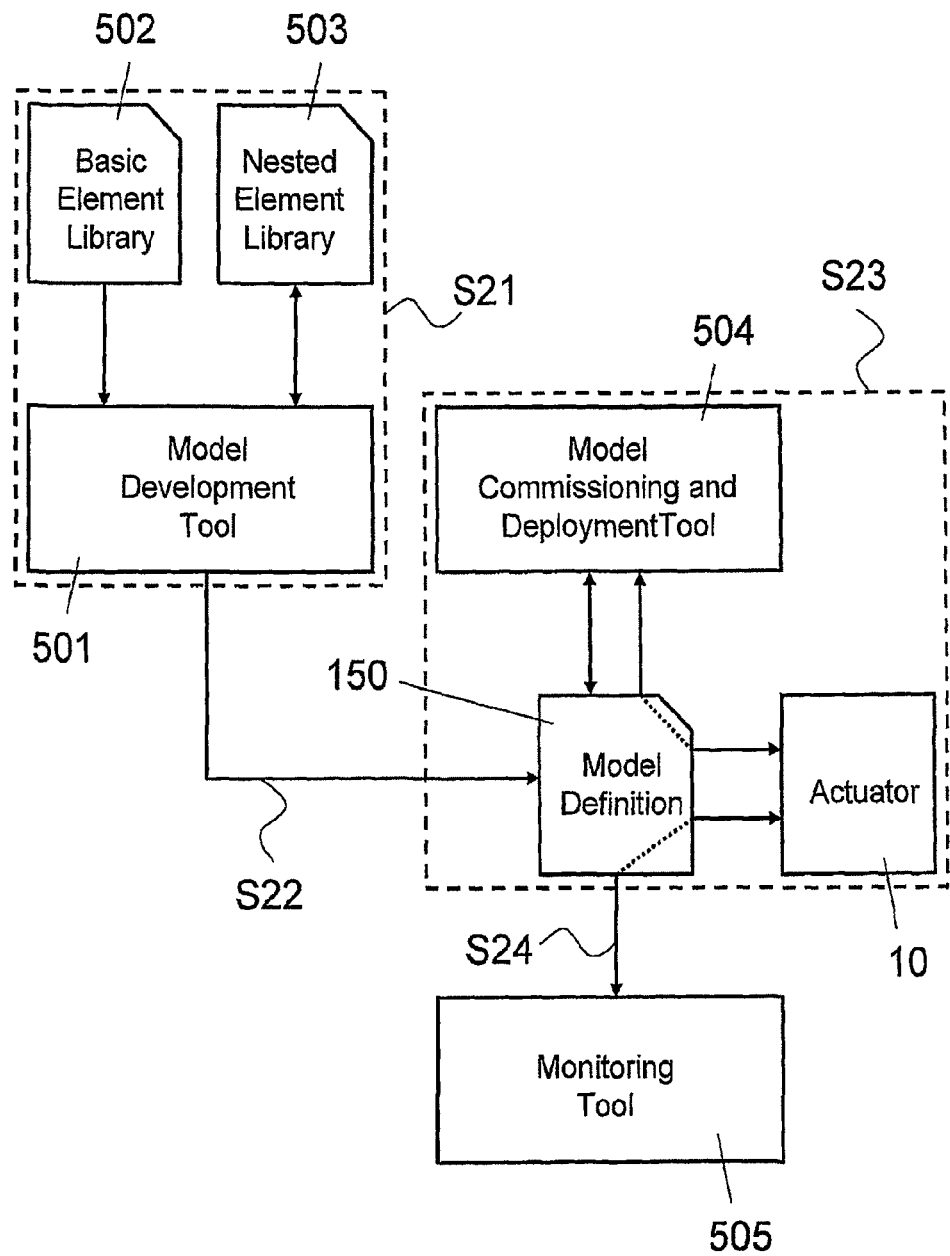
FIG. 3: shows a block diagram illustrating schematically a possible sequence for developing and generating a model definition for a complete or partial HVAC control application.

FIG. 3 gives an overview of the steps and tools involved in developing and generating a model definition 15. In a first step S21, a user of computer 5, e.g. a systems engineer, uses the model development tool 501 for designing and generating a model definition 150 of an HVAC control application or a part of an HVAC control application as illustrated in FIG. 4, for example. The model development tool 501 comprises a graphical editor, which makes it possible for a user to select controller modules, basic model elements as well as nested model elements, defined, e.g. in a mark-up language such as XML, and stored in a basic element library 502 or a nested element library 503, respectively. Using the graphical editor, model elements are associated with a selected controller module, as shown in the exemplary graphical representation 400. Selected controller modules and model elements are interconnected by defining in the graphical editor links (linking information) between the controller modules and model elements. Individual processing intervals are assigned to selected controller modules by the user. Moreover, module specific parameters are entered and assigned to model elements.

In step S22, a model generator of the model development tool 501 generates from the user input the model definition 150, e.g. in a mark-up language such as XML.

In step S23, using the model commissioning and deployment tool 504, the model definition 150 is mapped, e.g. by a user of computer 5, to the actual hardware configuration of the sensor/actuator bus 3, i.e. to the actuator 10 and the specific devices 4 attached to the bus. Depending on the embodiment, the model commissioning and deployment tool 504 supports dynamic detection and/or manual entry of addressing information. The model definition 150 is loaded from the model commissioning and deployment tool 504 into the actuator 10 via the model loader 102 (as indicated by reference numeral 15 in FIG. 2). The model commissioning and deployment tool 504 is further configured to load firmware, model elements for the element library 16, and/or a HTML representation of the model definition into the actuator 10 via the software loader 101. For each of its model elements, the model definition includes GUI data indicative of the respective model element's size and position in a graphical representation 400 of the model definition 15/150 of the HVAC control application. The model commissioning and deployment tool 504 is further configured to provide to a user of computer 5 access to the current model definition 15 stored in the actuator 10, and, particularly, to make it possible for the user to alter the model definition 15 at run-time, e.g. by adding or deleting model elements from the current model definition 15.

In step S24, for purposes of monitoring, parameterization and/or reverse engineering, a user of computer 5 uses a web browser, such as Internet Explorer by Microsoft Inc., Mozilla Firefox by the Mozilla Foundation, or Safari by Apple Inc., to upload and display a graphical representation 400 of the model definition 15 representative of the HVAC control application implemented and running on the actuator 10, including current values of system states, alarm and alert notifications, system and device parameter settings, and/or data values, such as temperature or air quality values.

Figure 7:
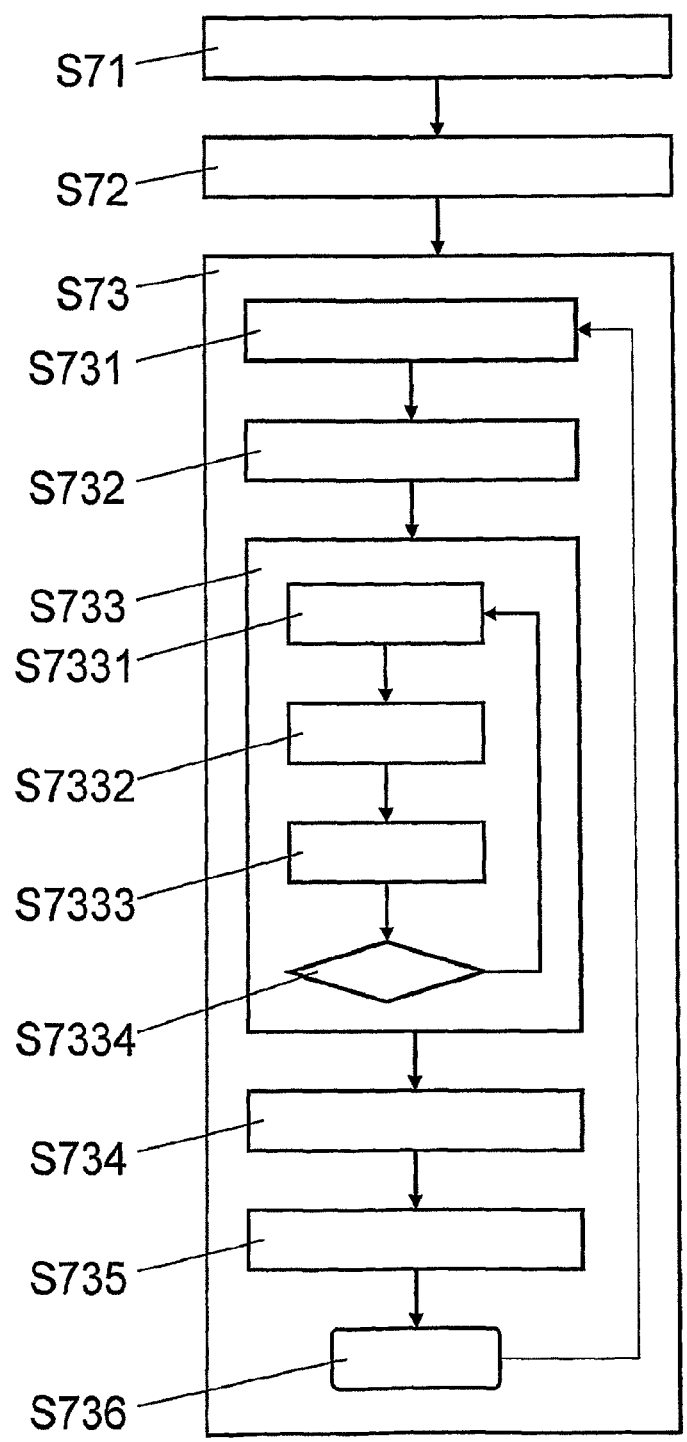
FIG. 7: shows a timing diagram illustrating an example of a sequence of steps for operating the actuator to execute an HVAC control application.

FIG. 7 illustrates a possible sequence of steps for operating the actuator 10 upon downloading and configuration (commissioning and deployment) of the model definition 15, and, in step S71, starting execution of the HVAC control application as defined by the model definition 15.

In step S72, the model interpreter 17 implements and generates the HVAC control application, by instantiating model elements from the element library 16 as identified by the model definition. The model elements are instantiated using element specific parameter values specified respectively in the model definitions 15 and/or by the parameterisation module 103. Specifically, the controller modules are instantiated to run as independent, parallel processes in separate threads on processor 11. For connecting model elements as specified by the linking information, established are associations between data input buffers and data output buffers of model elements as well as the peripheral data input buffers and data output buffers of the controller modules.

In step S73, execution of the HVAC control application starts, and execution of instantiated (model, bus and optional network) controllers as parallel processes is initiated.

In step S731, for managing their own respective processing intervals Td, Te, each of the instantiated controllers takes a time stamp at starting time Ts of a one-time execution (model update), as illustrated in FIG. 5 for the example of one-time computation of controller module D in step S61.

In step S732, each of the instantiated controllers propagates the current data values of its peripheral data input buffers to the data input buffers of the respective linked model elements.

In step S733, each of the instantiated controllers starts the sequential processing of its instantiated and interconnected model elements, i.e. the controllers each perform a one-time computation of their state machine, whereby the state transitions are executed by the individual model elements, as illustrated in FIG. 5 for the sequential processing of model elements B, C, and A, for example.

In step S7331, the model element to be processed reads the current data input from its associated input buffer(s), if applicable.

In step S7332, the respective model element calculates its output value(s) based on the input data read from the input buffer(s), and writes the output into its respective output buffer(s).

In step S7333, the respective controller module propagates the data from the element's output buffer(s) to the input buffers of linked model elements and/or to its peripheral data output buffers. One skilled in the art will understand, that a feedback of a data value to a model element already processed in the current processing interval, will no longer be processed for that model element in the current processing interval, but only in a subsequent processing interval.

In step S7334, the controller checks whether all model elements have been processed. If there are further model elements to be processed, processing continues in step S7331 by triggering processing of the next model element; otherwise, processing continues in step S734. The next model element to be processed is determined, for example, based on a processing sequence stored for the respective controller, e.g. a table identifying the instantiated model elements in sequential order of processing.

In step S734, once all the respective controller's model elements have been processed and their data output values have been propagated to the controller's peripheral output buffers, the respective controller module D propagates the data values of the controller's peripheral output buffers to linked peripheral input buffers of the other controllers, as illustrated in FIG. 6 for steps S63, S65, S67, and S69, for example.

In step S735, for managing the processing interval Td, Te, the respective controller D takes a time stamp at completion time Tc of the one-time execution (model update), as illustrated in FIG. 5 for the example of the one-time computation of controller module D in step S61. The actual processing time Tp is determined based on the starting time stamp Ts and the completion time stamp Tc.

In step S736, the respective controller D waits until a new processing interval Td begins, or starts a new processing interval Td immediately, if the actual processing time Tp exceeds the duration of the controller's interval Td. For a new interval Td, processing continues in step S731 by processing another one-time computation of the controller's instantiated and interconnected model elements.

The error handling module 105 provides for centralized error handling and is configured to process error events, and manage error scenarios for all parts of the HVAC application. The error handling module 105 is implemented as a separate layer, apart from the control logic.

Error scenarios describe error states (conditions) and respective system reactions. As illustrated schematically in FIG. 8, an error scenario 1050 is defined by one or more error filters 1051 and associated error actions 1052. An error filter 1051 defines criteria on error events 82, 83, e.g. severity level, for one or more associated error actions 1052 to be performed. Errors may be caused and detected in various components of the system. For example, if a temperature sensor does not provide a temperature value, higher level system components may detect this error state. Alternatively, the sensor may have some built-in functionality for polling its operational state. Moreover, the systems engineer may define specific states to be erroneous, e.g. the value provided by sensor not being within a defined range. Thus, error triggering mechanisms may be implemented at different hierarchical levels in different system components.

Figure 8:
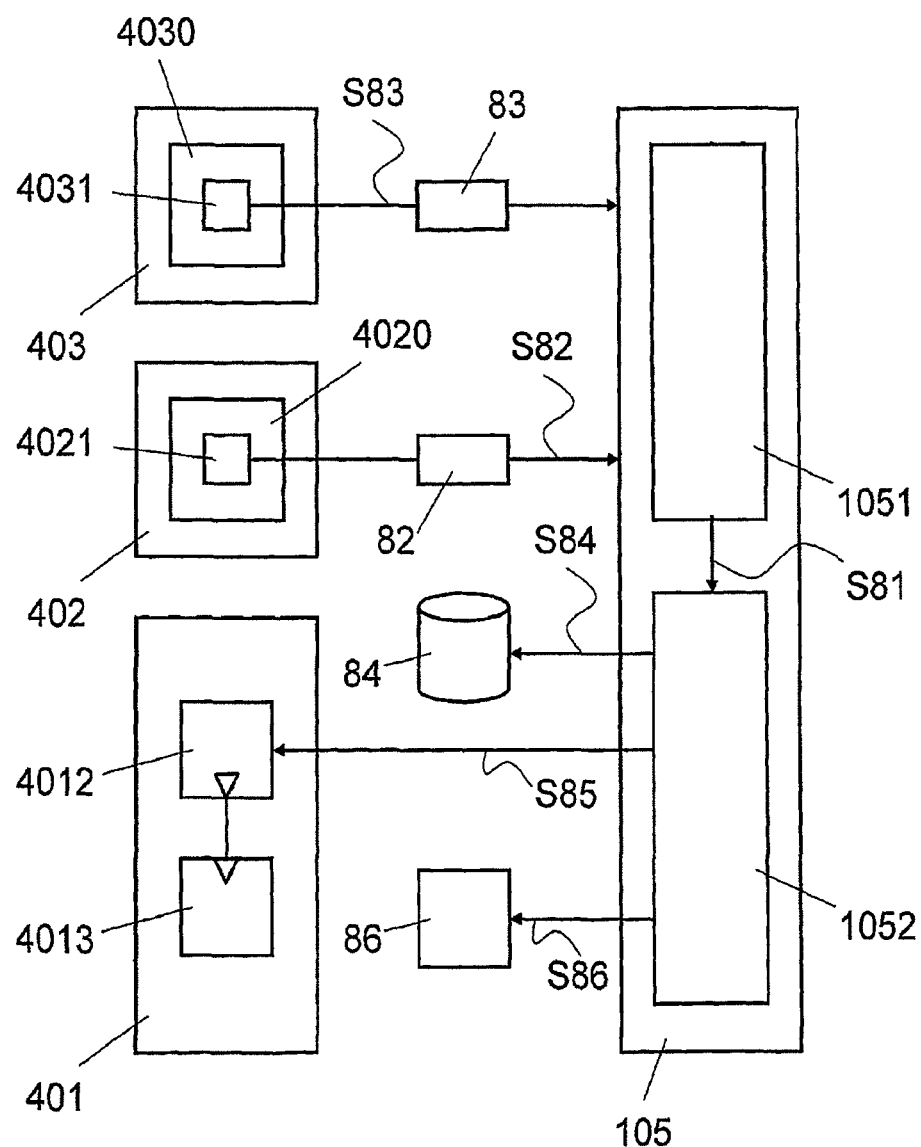
FIG. 8: shows a block diagram illustrating schematically a possible sequence for handling error states occurring in an HVAC control application.

For example, in FIG. 8, the I/O element 4020 of the bus controller module 402 includes an error triggering module 4021 which is configured to detect an error state in I/O element 4020. Upon detection of an error state, in step S82, the error triggering module 4021 is generates and indicates to the error handling module 105 an error event 82. Correspondingly, the I/O element 4030 of the network controller module 403 includes an error triggering module 4031 which is configured to detect an error state in I/O element 4030 and trigger an error event 83, in step S83.

The error handling module 105 applies its error filters 1051 to determine any action 1052 to be performed in response to the error event 82, 83. Accordingly, in step S81, the error handling module 105 triggers one or more actions 1052. For example, in step S84 the respective error is recorded in error log 84.

In step S85, the error handling module 105 triggers an error catcher module 4012 in the model controller module 401. The error catcher module 4012 is configured to set its data output buffer o to a defined value, e.g. one, when it is triggered by the error handling module 105. In this way, the error is signalled to any model (control) element 4013 that has a data input buffer i linked to the error catcher module 4012. For example, model element 4013 is a multi-mode model element configured to be operable in different modes, depending on a state selected for the respective model element at run-time. Thus, by linking the data output buffer o of the error catcher module 4012 to the data input buffer i of the multi-mode model element 4013, the model element 4013 operates in a regular mode or an error mode, depending on error states detected in an I/O element 4020, 4030 and managed by the error handling module 105. In each state of a multi-mode model element, the multi-mode element is represented as a different combination of model elements, nested model elements and their interconnections. Only one state, i.e. one mode, can be active for a multi-mode model element at any given point in time. The state or mode of a multi-mode model element is selected through setting of an input value. The current state or mode of a multi-mode model element is indicated through a respective output value.

In step S86, the error handling module 105 triggers an electronic messaging module 86. The electronic messaging module 86 is configured to generate and transmit via communication network 2 an electronic message to one or more defined addresses. Depending on the embodiment, the electronic message is an e-mail message, an SMS message (Short Messaging Services) or another data message.

The proposed actuator 10, 10' provides a platform for implementing decentralized and distributed control for HVAC systems. It is possible to change dynamically the HVAC application by loading new model definitions. Components of the HVAC system, particularly the actuators 10, 10' and the controller modules, are loosely coupled and interconnected for asynchronous data transfer. As HVAC applications operate in an environment that changes gradually, reaction times of the system can be relatively slow. Consequently, there is no real need to impose temporal dependencies on components of the control application that exchange data.

It should be noted that, in the description, the computer program code, including instructions for controlling a Java processor, has been associated with specific functional modules and the sequence of the steps has been presented in a specific order, one skilled in the art will understand, however, that the computer program code may be structured differently and that the order of at least some of the steps could be altered, without deviating from the scope of the invention.

The invention claimed is:

1. An actuator for HVAC systems, the actuator comprising:
 a network interface for connecting the actuator to a communication network,
 a bus interface for connecting the actuator to a sensor/actuator bus,
 a data store, and
 a processor connected to the data store;
 wherein the actuator further comprises: a loader configured to receive via the communication network and store in the data store a model definition defining an HVAC control application;
 an element library including a variety of stored model elements comprising instructions for controlling the, processor, and
 controller modules configured in each case to control the sequential order of execution for associated model elements referenced by the respective controller module, to propagate external data input to its associated model elements prior to beginning the execution of the model element defined first in the sequential order, and to propagate data output from its associated model elements to the outside of the respective controller module at completion of the execution of the model element defined last in the sequential order; and a model interpreter configured to implement based an the model definition the control application for execution on the processor, by instantiating controller modules and their associated model elements as referenced by the model definition, assigning at least one instantiated model element to a device attached to the sensor/actuator bus, and instantiating the controller modules in each case as a different thread of execution, wherein data is interchanged asynchronously between instantiated controller modules.

2. The actuator of claim 1, wherein the model elements are in each case configured to read input data from one or more defined data input buffers associated with the respective model element, and to write output data to one or more defined data output buffers associated with the respective model element; the model interpreter is further configured to link, based on linking information included in the model definition, output buffers of instantiated model elements to input buffers of instantiated model elements; and the controller modules are configured to propagate in each case, upon completion of the execution of model elements referenced by the respective controller module, data values from the model element's output buffer to a linked input buffer of a model element referenced by the respective controller.

3. The actuator of claim 1, wherein the model definition includes identifiers of model elements and parameter values applicable in each case to the respective model element; the model interpreter is configured to instantiate in each case the model element from the element library based on the identifier and parameter values; and the controller modules are configured to execute in individual processing intervals assigned in each case to the respective controller module.

4. The actuator of claim 1, wherein the model definition includes graphical user interface data associated with model elements referenced by the model definition, the graphical user interface data including at least position information for positioning on a display a graphical representation of the respective element.

5. The actuator of claim 1, wherein at least some of the stored model elements are configured to be operable in different modes, the modes being selectable through setting at run-time of a state associated with all instantiation of the respective model element.

6. The actuator of claim 1, further comprising a server module configured to transmit to a web browser a graphical representation of the control application via the communication network based on the model definition, to transmit to the web browser for display in the graphical representation input/output values associated in each case with a model element referenced by the model definition, to receive from the web browser parameter values associated in each case with a model element referenced by the model definition, and to store in the actuator the parameter values assigned to an instantiation of the respective model element.

7. The actuator of claim 1, wherein the stored model elements include elements representative, of at least one of controller, PID controller, two point controller, limiter, timer, Boolean logic module, time period management module, heating curve module, filter module, floating average calculation module, flip flop module, input selector module, constant value module, comparator, mathematical operation module, state checking module, error catching module, and error trigger module.

8. The actuator of claim 1, wherein the network interface is configured for communication according to the Internet Protocol over an Ethernet communication network; the sensor/actuator bus includes one of MP-Bus and BACnet-bus; the model definition is defined in a mark-up language; the stored model elements are defined in Java byte code; the processor is a Java processor configured to execute Java byte code; and the loader is further configured to store in the actuator at least one HTML version of the model definition.

9. A method for operating an actuator of an HVAC system, the method comprising:

storing in the actuator a model definition defining an HVAC control application; storing in the actuator an element library which includes a variety of model elements and controller modules, the model elements and controller modules comprising instructions for controlling a processor of the actuator;

implementing in the actuator, based on the model definition, the control application for execution on the processor, by instantiating from the element library controller modules and associated model elements as referenced by the model definition, assigning at least one instantiated model element to a device attached to a sensor/actuator bus, and instantiating the controller modules in each case as a different thread of execution; and executing the control application 'by the respective controller modules in each case controlling the sequential order of execution for associated model elements referenced by the respective controller module, propagating external data input to its associated model elements prior to beginning the execution of the model element defined first in the sequential order, and propagating data output from its associated model elements to the outside of the respective controller module at completion of the execution of the model element defined last in the sequential order, wherein data is interchanged asynchronously between instantiated controller modules.

10. The method of claim 9, wherein the model elements read input data from one or more defined data input buffers associated with the respective model element, and write output data to one or more defined data output buffers associated with the respective model element; output buffers of model elements are linked to input buffers of model elements, based on linking information included in the model definition; and, upon completion of the execution of model elements referenced by a respective controller module, data values are propagated in each case from the model element's output buffer to a linked input buffer of a model element referenced by the respective Controller.

11. The method of claim 10, wherein the model elements are instantiated from the element library in each case based on an identifier and respective parameter values included in the model definition; and instantiated controller modules execute in individual processing intervals assigned in each case to the respective controller module.

12. The method of claim 10, wherein the model definition includes graphical user interface data associated with model elements referenced by the model definition, and a graphical representation of a respective model element is positioned on a display based on position information included in the graphical user interface data.

13. The method of claim 10, wherein selected at run-time is a state associated with an instantiation of a model element, the state setting the respective model element to operate in one of at least two different modes.

14. The method of claim 10, wherein, based on the model definition, a graphical representation of the control application is transmitted from the actuator via the communication network to a web browser; input/data output values, associated in each case with a model element referenced by the model definition, are transmitted from the actuator to the web browser for display in the graphical representation; parameter values, associated in each ease with a model element, referenced by the model definition, are received in the actuator from the web browser, and the parameter values are stored in the actuator assigned to an instantiation of the respective model element.

15. The method of claim 9, wherein the model elements are instantiated from the element library in each case based on an identifier and respective parameter values included in the' model definition; and instantiated controller modules execute in individual processing intervals assigned in each case to the respective controller module.

16. The method of claim 9, wherein the model definition includes graphical user interface data associated with model elements referenced by the model definition, and a graphical representation of a respective model element is positioned on a display based on position information included in the graphical user interface data.

17. The method of claim 9, wherein selected at runtime is a state associated with an instantiation of a model element, the state setting the respective model element to operate in one of at least two different modes.

18. The method of claim 9, wherein, based on the model definition, a graphical representation of the control application is transmitted from the actuator via the communication network to a web browser; input/data output values, associated in each case with a model element referenced by the model definition, are transmitted from the actuator to the web browser for display in the graphical representation; parameter values, associated in each case with a model element referenced by the model definition, are received in the actuator from the web browser; and the parameter values are stored in the actuator assigned to an instantiation of the respective model element.

19. A computer program product comprising a non-transitory computer readable medium embodying computer program code means for controlling a processor of an actuator of an HVAC system, wherein the actuator receives via a communication network a model definition defining an HVAC control application;

stores the model definition in a data store of the actuator;

implements based on the model definition the control application for execution on the processor of the actuator, by instantiating from a stored element library controller modules and associated model elements as referenced by the model definition, assigning at least one instantiated model element to a device attached to a sensor/actuator bus, and instantiating the controller modules in each case as a different thread of execution, and executes the control application by controlling the sequential order of execution for associated model elements referenced by the respective controller module, by propagating external data input for the respective controller module to its associated model elements prior to beginning the execution of the model element defined first in the sequential order, and by propagating data output from the associated model elements to the outside of the respective controller module at completion of the execution of the model element defined last in the sequential order, wherein data is interchanged asynchronously between instantiated controller modules.

* * * * *